United States Patent [19]

Shiota

[11] Patent Number: 4,942,462
[45] Date of Patent: Jul. 17, 1990

[54] PHOTOGRAPHIC PRINTER HAVING A CRT FOR ILLUMINATING AN ORIGINAL WITH A FLYING SPOT TO PRINT AN IMAGE OF THE ORIGINAL

[75] Inventor: Kazuo Shiota, Kanagawa, Japan

[73] Assignee: Fuji Photo Film Co., Ltd., Kanagawa, Japan

[21] Appl. No.: 218,793

[22] Filed: Jul. 14, 1988

[30] Foreign Application Priority Data

Jul. 15, 1987 [JP] Japan ............................ 62-176470
Jul. 31, 1987 [JP] Japan ............................ 62-191684
Sep. 18, 1987 [JP] Japan ............................ 62-233799

[51] Int. Cl.[5] ............................................ G03F 3/10
[52] U.S. Cl. ...................................... 358/76; 358/75; 358/78; 358/80; 355/20
[58] Field of Search ............... 358/75, 80, 76, 31, 358/78, 32, 11, 36, 160, 167; 364/518; 355/38, 20

[56] References Cited

U.S. PATENT DOCUMENTS

| | | | |
|---|---|---|---|
| 4,096,523 | 6/1978 | Belmares-Sarabia et al. | 358/80 |
| 4,097,892 | 6/1978 | Balding | 358/80 |
| 4,394,089 | 7/1983 | McIntosh et al. | 358/75 |
| 4,638,353 | 1/1987 | Nagasaki et al. | 358/98 |
| 4,698,676 | 10/1987 | Kubota et al. | 358/160 |
| 4,729,015 | 3/1988 | Wagensonner | 358/78 |
| 4,733,295 | 3/1988 | Hemsky et al. | 358/80 |
| 4,736,244 | 4/1988 | Shiota et al. | 358/80 |
| 4,764,793 | 8/1988 | Goll et al. | 355/38 |
| 4,764,807 | 8/1988 | Kimura et al. | 358/75 |
| 4,769,694 | 9/1988 | Oshikoshi | 358/75 |
| 4,782,390 | 1/1988 | Hayashi et al. | 358/78 |
| 4,786,944 | 11/1988 | Sakamoto et al. | 355/20 |
| 4,794,454 | 12/1988 | Sugiyama et al. | 358/167 |
| 4,811,097 | 3/1989 | Ritter et al. | 358/36 |
| 4,837,624 | 6/1989 | Heitmann et al. | 358/336 |
| 4,849,809 | 7/1989 | Tahara et al. | 358/75 |

FOREIGN PATENT DOCUMENTS 45-5336 2/1970 Japan.
58-66929 4/1983 Japan.

Primary Examiner—Howard W. Britton
Assistant Examiner—Kim Yen Vu
Attorney, Agent, or Firm—Sughrue, Mion, Zinn, Macpeak & Seas

[57] ABSTRACT

A photographic printer having a CRT for illuminating an original with a flying spot to print an image of the original on a photographic material is provided with a digital filter for filtering video signals of the original in digital form to cancel the persistency effect of the CRT. An image signal processing device processes the video signals for color and gradation corrections, and a controlling device controls the CRT to cause the flying spot to have its luminance varied according to the image-processed video signals. The video signals after image processing are displayed on a monitor for visual inspection.

15 Claims, 4 Drawing Sheets (1ST GAMMA CORRECTION LUT)

(DISPLAY LUT)

(2ND GAMMA CORRECTION LUT)

(CRT ILLUMINATION CONTROL LUT)

PHOTOGRAPHIC PRINTER HAVING A CRT FOR ILLUMINATING AN ORIGINAL WITH A FLYING SPOT TO PRINT AN IMAGE OF THE ORIGINAL

BACKGROUND OF THE INVENTION

The present invention relates to a photographic printer in which a CRT is used as a light source for making a print from an original.

There have been known photographic printers having CRTs as light sources for illuminating an original such as a negative film or a positive film from which prints are made. In such a photographic printer, the negative film is scanned with a flying light spot produced by the CRT. the luminance of which is controlled to transform the gradation, in particular the contrast, of an image to be printed. One such photographic printer is disclosed in. for example. Japanese Patent Publication No. 45-5336. The photographic printer disclosed in the above-mentioned Japanese Patent Publication is provided with a half mirror in the printing path between the negative film and a photographic material to reflect part of a flying spot produced by the CRT and passed through the negative film to provide a luminance control signal with which the flying light spot of the CRT is controlled in luminance.

Another photographic printer, disclosed in Japanese Unexamined Patent Publication No. 58-66,929 uses three separate CRTs for red, green and blue light, each of which scans a color original with a flying spot to determine the exposure, provide a particular illumination pattern, and print an image on a photographic material. In scanning for determining the exposure, the CRT is excited in such a way that the phosphor screen of the CRT emits light with a standard luminance. The light spot from the CRT is passed through the color original and detected separately by red, green and blue light measuring means so as to provide three color video signals. From the video signals, image characteristic values, for example a maximum density, a minimum density and a mean density are extracted to obtain the density difference between the maximum and minimum densities, by color. Then. a control signal is provided for each color to make the density difference coincide with a standard value. In scanning to provide the illumination pattern, the CRT is controlled with the control signal to provide a flying spot with a controlled luminance. The flying spot passed through the color original is measured by light measuring means, by color. to provide video signals which are memorized in a memory to provide a particular illumination pattern which is similar to a blurred image of the original. In scanning for printing, the color original is placed in contract with the CRT so as to be illuminated by the CRT. The luminance of the flying spot of the CRT is controlled according to the video signals read out from the memory and the exposure time is controlled according to the mean density. In this way, an image of the color original illuminated with the blurred image illumination pattern is exposed on the photographic material.

For making prints with well controlled color balance and gradation. a photographic printer may be provided with a color monitor to display the color image to be printed for simulation and visual inspection. Such a photographic printer with color monitor is disclosed in, for example, U.S. Pat. No. 4,668,082.

One problem with the prior photographic printer is that the use of high CRT luminance, although advantageous in order to reduce the exposure time. results in long image persistency. Therefore, when causing the CRT to produce a high luminance flying spot for the purpose of reducing the exposure time, the video signal provided for each point of the original scanned by the flying spot is affected by the after image of the last scanned point, resulting in a low SN ratio of the video signal due to the persistency of the previous video signal.

Another problem in the prior photographic printer is the difficulty of gradation correction. This is due to the fact that, in the prior photographic printer, gradation correction is effected by transferring contrast. Furthermore, since gradation correction is made linearly with respect to the transmittance of an original, it is difficult to correct the gradation non-linearly in order to effect a correction (which is usually linear with respect to density) which is necessary to conform to human sensory perception. or to correct for under exposed or over exposed originals.

Further, the photographic printer with built-in monitor is used not only to make prints but to inspect the original before printing and is capable of correcting for changes in the luminance of a halogen lamp due to aging, because the halogen lamp is commonly used in printing and inspecting. However, it is difficult in this photographic printer to correct for the shading which is produced due to the gradation characteristic of the halogen lamp and/or the optical characteristic of the printing lens.

OBJECTION OF THE INVENTION

It is, therefore, an object of the present invention to provide a photographic printer which can make use of a high luminance CRT while avoiding the persistence effect of the video signals.

It is another object of the present invention to provide a photographic printer which can make chroma and gradation corrections and which permits visual inspection of the chroma and gradation corrected image.

It is still another object of the present invention to provide a photographic printer which can effect shading correction.

SUMMARY OF THE INVENTION

To accomplish the above and other objects, the present invention provides a photographic printer with a CRT light source for illuminating an original such as a positive film or a negative film with a flying light spot, which is provided with a digital filter for filtering the video signals after the same have been transformed into digital form. so as to cancel the effects due to persistency of the CRT.

According to a feature of a preferred embodiment of the present invention the photographic printer is provided with means for processing the filtered video signals and means for controlling the CRT to scan the original with a flying spot having its luminance varied according to the image-processed video signals when making a print. The CRT is controlled to generate a desired pattern of illumination in consideration of the shading characteristics of the CRT. the printing lens, etc.

According to another feature of the preferred embodiment of the present invention, the photographic printer is provided with a mirror for reflecting the flying spot passed through the original, means for measuring the flying spot reflected by the mirror to provide video signals of the original in three colors, an A/D converter for converting the video signals into digital form, by color, a frame memory for memorizing the digital video signals, by color, means for effecting chroma correction for the video signals. means for effecting a non-linear gradation correction for the chroma-corrected video signals, a monitor for displaying the gradation corrected video signals as a visual image thereon, and means for controlling the CRT to generate a modified illumination pattern according to the chroma and gradation-corrected video signals.

Owing to the provision of the digital filter, it becomes possible to make use of high CRT luminance without creating an effect due to the persistency of the CRT. This results in a shortened exposure time for printing. Furthermore, since the video signals are displayed on the monitor after being filtered, the image displayed on the monitor is quite vivid. Since the correction of both chroma and gradation can be effected while visually inspecting an image displayed on the monitor, it is easy to make a print having well corrected chroma and gradation. As a result, efficient printing can be conducted because of the greatly reduced number of substandard prints.

DETAILED DESCRIPTION OF THE INVENTION

Figure 1:
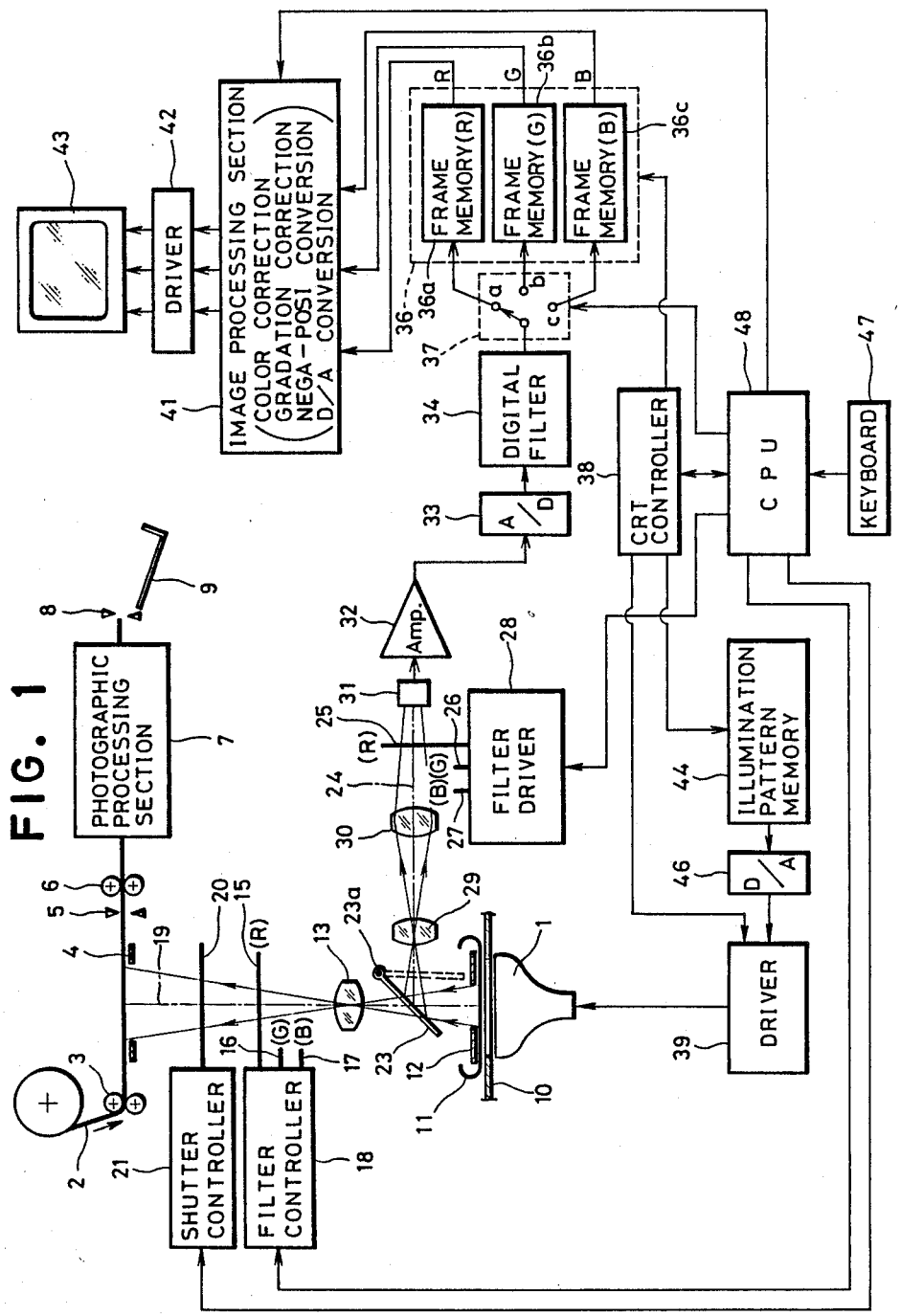
FIG. 1 is a schematic block diagram showing the photographic printer according to a preferred embodiment of the present invention.

Referring now to FIG. 1 showing the photographic printer according to a preferred embodiment of the present invention, there is provided a black-and-white CRT 1 for displaying a black-and-white image thereon. Above the black-and-white CRT 1. there is a photosensitive material such as color photographic paper 2 in the form of a roll which is withdrawn by means of a pair of rollers 3 so as to be placed in an exposure station defined by a framing mask 4. After the exposure of a predetermined number of frames, the exposed photographic paper 2 is cut into a single strip by a cutter 5 and sent to a photographic processing section 7 by a pair of rollers 6. In the photographic processing section 7, the strip of exposed photographic paper 2 is subjected to necessary development processing and. thereafter, cut into individual prints by a cutter 8. These prints are delivered to an external tray 9.

In the photographic printer, the black-and-white CRT 1 is used as a light source to illuminate an original film such as a color negative film 11. To hold the color negative film 11 flat. there is provided a framing mask 12 which is actuated by a solenoid (not shown) to press down on the color negative film 11. It will be understood that prints can be made from a color reversal film by using color reversal photographic paper and a developer for the color reversal photographic paper.

Between the black-and-white CRT 1 and the color photographic paper 2, there is a printing lens 13. Above the printing lens 13 there are three color filters, namely red (R), green (G) and blue (B) filters 15, 16 and 17 which are driven by a filter control 18, each color filter being insertable into the printing path 19 independently of the other two so as to make a print from the color negative film 11 according to a three color frame sequential exposure technique.

Disposed between the printing lens 13 and the masking frame 4 is a shutter 20 controlled by a shutter controller 21. The shutter will open and close three times, once for each color, for each exposure. In the printing path between the black-and-white CRT 1 and the printing lens 13, there is removably disposed a reflection mirror 23 pivotally mounted on a shaft 23a at an angle of 45° with respect to the printing path 19 to reflect and direct the light from the black-and-white CRT 1 toward an image inspection system which will be described in detail later. This mirror 23 is displaced from the printing path 19 and placed in the position shown by a broken line in FIG. 1 when making a print. In place of the reflection mirror 23, a half mirror may be stationarily provided in the printing path 19.

The light reflected by the mirror 23 is focused on a photomultiplier tube 31 through a focusing lens 29 and a field lens 30 disposed in an image inspection path 24. Further disposed in the image inspection path 24 are three primary color filters, namely red (R), green (G) and blue (B) filters 25, 26 and 27 used in light measurement. Each color filter 25, 26, 27 is controllably insertable into the image inspection path independently of the other two under the control of a filter controller 28.

The photomultiplier tube 31 photoelectrically converts the light passing through the color negative film, which is scanned with the flying spot. Since the output from the photomultiplier 31 is of low level, there is provided an amplifier 32 to amplify the low level output. The amplified output is sent to an A/D converter 33 for analog-to-digital conversion. A digital filter 34 of the non-recursive type is provided to cancel signal elements due to the persistence of the phosphor screen of the CRT 1 so as to provide an ideal impulse response. In more detail. the digital filter 34 functions to eliminate distortions due to the long residency time of the phosphor screen of the CRT 1. The construction of the filter 34 is itself well known in the art. For example, the filter 34 may be of the type described in "Recent AV Devices and Digital Techniques", Corona Publishing Co. Ltd., Dec. 10, 1986, pp. 28-31, the disclosure of which is hereby incorporated by reference. A non-recursive filter of simple structure is used. The filter includes a data RAM used as a delay-line memory. a ROM for memorizing a plurality of coefficients, a multiplier for multiplying a data group from the RAM by the coefficients, an adder circuit and an output latch. The data RAM memorizes a number N. for example four. units of data. When a unit of data is entered. the first unit of data in the RAM is read out and is multiplied by a first coefficient read out from the ROM. The resulting product is added to the previous product, and the resultant data is latched in the output latch. In this manner, four such products are added, and latched into the output latch, in a manner so as to cancel out the persistence effect of the phosphor screen. The device thus functions as a low-frequency after-image cancelling filter which eliminates signal distortions due to the persistence or residency time of the scanned phosphor screen.

A frame memory section 36 comprises three frame memories. one for each color, for holding therein video signals selected by a selector switch 37. A CRT controller 38 provides a CRT driver 53 for the CRT 1 with synchronizing signals. and provides the frame memory section 36 with address signals corresponding to scanning points on a raster. Using the address signals. the frame memory section 36 writes in video signals therein. After the completion of writing in the video signals for the three colors, the video signals are read out from the frame memory section 36 and sent to an image processing section 41 for gradation and color correction, negative-to-positive conversion and digital-to-analog (D/A) signal conversion.

The processed video signals are transferred to a color monitor 43 such as a color CRT through a driver 42 to display the video signals as a color positive image on the screen. It will be apparent that, when making a print from a color reversal film, no negative-to-positive conversion is conducted in the image processing section 41.

Figure 4:
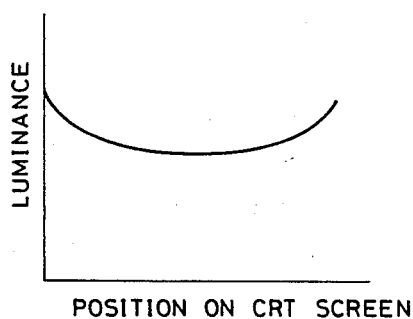
FIG. 4 is a graph showing a luminance curve of a CRT.

An illumination pattern memory 44 is provided to memorize data to control the illumination pattern of the CRT 1 to emit light so as to suitably correct for shading caused by the printing system. The illumination pattern data which is given by, for example, the curve shown in FIG. 4 is read out using an address signal provided by the CRT controller 38 and is transmitted to a driver 39 after digital-to-analog signal conversion in a D/A converter 46.

Connected to a central processing unit (CPU) 48 is a keyboard 47 provided with a power switching key, a printing key, density correction keys, color correction keys and so forth to enter necessary instructions for the CPU 47. The controller 35 performs a programmed sequence of operations to control the image processing section 41, the CRT controller 38, the filter controllers 18 and 28, the shutter controller 21, the three way selector switch 37, the pattern memory 44, etc.

Figure 2:
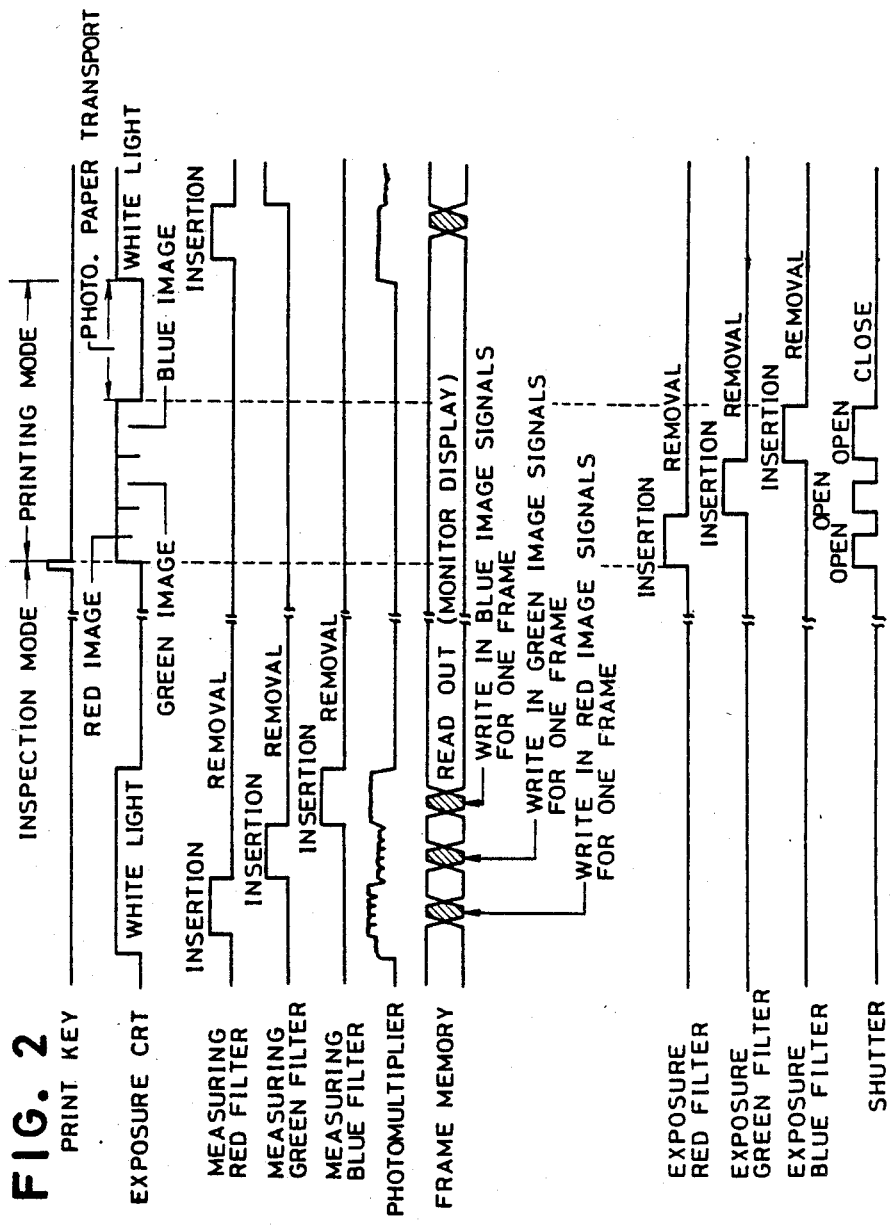
FIG. 2 is a time chart showing the sequence of the printing operations performed by the photographic printer of FIG. 1.

Reference is now made to FIG. 2 for explaining the operation of the video printer shown in FIG. 1. Before entering instructions through the keyboard 47, the color negative film 11 is set in the negative carrier 10 and pressed down by the framing mask 12.

When the power key of the keyboard 47 is operated, the mirror 23 is brought into the printing path 19 at an angle of 45° to start the negative inspection mode. Simultaneously. the CRT controller 38 reads out illumination pattern data from the pattern memory 44 to excite the CRT 1 to continuously emit light in a selected illumination pattern for a certain time period. At the beginning of the negative inspection mode, the red filter 25 is inserted into the inspection optical path 24 and the selector switch 37 selects the frame memory 36a to become ready for reading a red image. Immediately after the insertion of the red filter 25, the spot reflected by the mirror 23 is directed to the photomultiplier tube 31 through the lenses 29 and 30 and the red filter 25. The photomultiplier tube 31 photoelectrically converts the red light into time serial video signals which in turn are amplified by the amplifier 32 and then converted into digital form by the A/D converter 33. The digital video signals are sent to the digital filter 34 and filtered therein to eliminate distortions due to the persistence of the phosphor screen of the CRT 1. The red video signals from the digital filter 34 are transferred to the frame memory 36a selected by the selector switch 37. The CRT controller 38 provides and sends address signals corresponding to positions of the phosphor screen of the CRT 1 scanned with the flying spot to the frame memory 36a. Therefore, the frame memory 36a writes in the red video signals for one frame at the indicated addresses.

After replacing the red filter 25 with the green filter 26. the photomultiplier tube 31 receives the light reflected by the mirror 23 through the lens 29 and 30 and the green filter 26 and transforms the light into time serial video signals. After having been subjected to analog-to-digital signal conversion in the A/D converter 33, the digital video signals are written in a memory area 36b of the frame memory 36 selected by the selector switch 37.

In the same way. digital video signals for blue light are written in an area of the frame memory 36b selected by the selector switch 37. It is permissible to provide three light receiving devices and three sets of red, green and blue filters, one set for each light receiving device. to simultaneously detect the digital video signals for all three colors. The three color video signals written in the frame memory 36 are transmitted to the image processing section 41 for the purpose of image processing such as negative-to-positive image conversion and color and gradation corrections. After such image processing, the video signals are sent to the color monitor 43 through the driver 42 to display a positive color image. This positive color image is clearly displayed on the color monitor 43 without distortion.

During visual inspection of the color image displayed on the color monitor 43, if color failure and/or density failure is observed, the density correction keys and/or the color correction keys of the keyboard are operated to enter suitable correction values. Consequently, the CPU 48 writes corrected table data in the image processing section 41 to display a corrected color image. The CPU 48 controls the exposure times according to the correction values when printing.

When the image displayed on the color monitor 32 is found suitable to be printed, the print key of the keyboard 47 is operated to conduct the photographic printing mode. As a result of the operation of the print key, the mirror 23 is removed from the printing path 19 and the CRT 1 emits light in an illumination pattern memorized in the pattern memory 44. When the red filter 15 is placed in the printing path 19, the CPU 48 controls the shutter 21 to open for an exposure time suitable for red, exposing the color photographic paper 2 to the red image.

After the exposure of the photographic paper to the red image, the shutter 20 is closed and the red filter is replaced with the green filter 16. Then, the shutter 20 is opened again to expose the color photographic paper 2 to a green image. In the same way, the color photographic paper 2 is exposed to a blue image. As a result, color latent images are formed on the color photographic paper 2 by sequential exposure.

The photographic printing mode and the image inspection mode are alternatively repeated for a number of frames of the color negative film 11. After the completion of printing of a predetermined number of image frames of the color negative film 11, the cutter 5 is actuated to cut the exposed part of the color photographic paper 2 into a print strip. This print strip is sent to the photographic processing section 6 by the rollers 7 for necessary processing. Then, the print strip is cut into individual prints by the cutter 8 and delivered to the tray 9.

Figure 3:
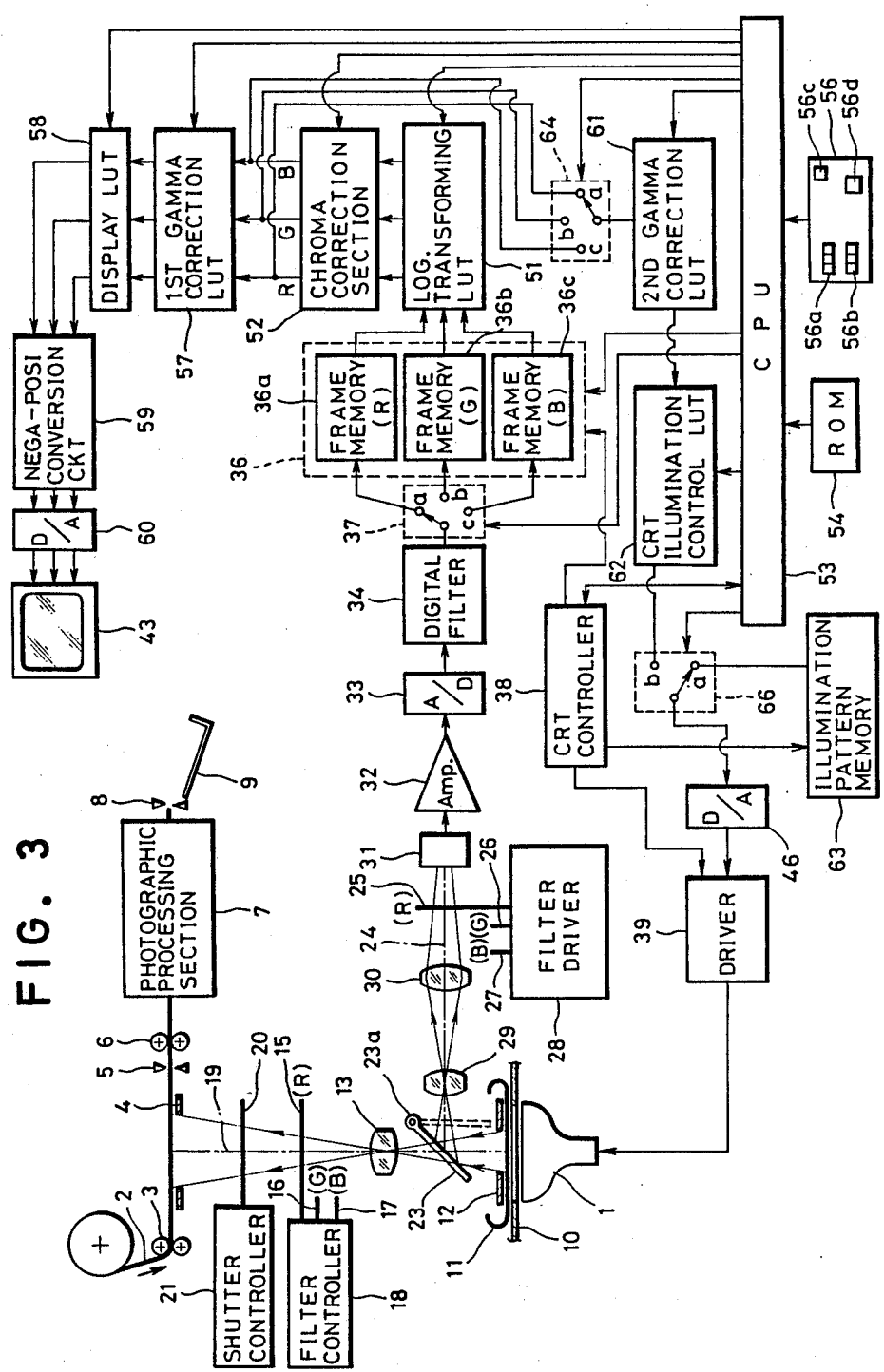
FIG. 3 is a schematic block diagram showing the photographic printer according to another preferred embodiment of the present invention.

FIG. 3 shows a photographic printer according to another preferred embodiment of the present invention, which has a special masking function. Three color video signals written into the frame memories 36a to 36c of the memory section 36 are sent to a logarithmic transforming look-up table memory (hereinafter referred to as an LUT) 51 by color. The LUT 51 provided for each color memorizes logarithmic transformation table data for logarithmically transforming a signal proportional to the intensity of light passed through the color negative film 11 to provide a signal proportional to the density of the color negative film 11. The density-proportional signal is sent to a chroma correction section 52. By shifting the level of each logarithmic transformation look-up table memory 51. gradation correction is made linearly.

The chroma correction section 52 comprises three LUTs, one for each color, and an adder. Each LUT memorizes table data, which is input data multiplied by a coefficient matrix. The adder adds outputs from the LUTs by color. In the chroma correction section, a well known matrix operation is performed to correct for the difference between the spectral sensitivity of the color photographic paper 2 and the spectral transmittance of each exposure color filter 15, 16, 17. Table data correction in the chroma correction section 52 is effected by the CPU 53. Specifically, there are provided in ROM 54 several different 3×3 matrix coefficients which are selected by operating chroma correction keys 56a of the keyboard 56 to designate a desirable channel. Inputs to the chroma correction section are multiplied by the selected matrix coefficients to provide nine look-up table data, three for each color, which are written in look-up table memories to change the correction values for chroma correction.

The three color video signals after chroma correction are sent to both a monitor system and a CRT illumination control system. The monitor system comprises, as will be described later, a first gamma (γ) correction LUT 57 provided for each color, a display LUT 58, a negative-to-positive conversion circuit 59, a D/A converter 60 and a color monitor 43. This color monitor 43 displays a simulated color positive image appearing on a print. The CRT illumination control system comprises a second gamma (γ) correction LUT 61 for making gamma correction by color, an illumination control LUT 62, an illumination pattern memory 63, a D/A converter 46, a driver 39, a CRT controller 39 and a CRT 1.

Figure 5:
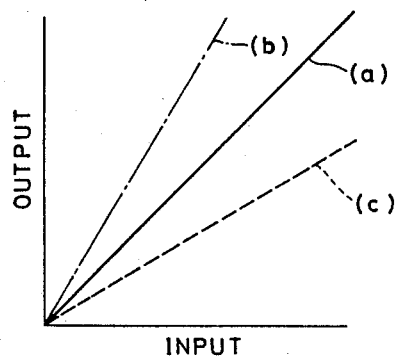
FIG. 5 is a graph showing characteristic curves of table data for a first gamma correction LUT.
Figure 6:
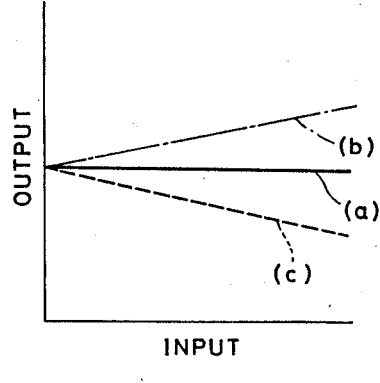
FIG. 6 is a graph showing characteristic curves of table data for a second gamma correction LUT.

The first and second gamma correction LUTs 57 and 61 are provided to amplify signals input thereto so as to effect a gradation correction, respectively. When the gamma correction key 56b of the keyboard is operated to enter a necessary correction value, the CPU 53 shifts the standard table data in the ROM 54 and writes the shifted table data in both the first and the second gamma correction LUTs 57 and 61. Specifically, the ROM 54 carries table data as shown in FIG. 5 for the first gamma correction LUT 57 and table data as shown in FIG. 6 for the second gamma correction LUT 61. The CPU 53 writes data in the first and the second gamma correction LUTs 57 and 61. If it is unnecessary to make any gamma correction, the CPU 53 writes data (a) of FIG. 5 in the first gamma correction LUT 57 and data (a) of FIG. 6 in the second gamma correction LUT 61. When making a gradation correction to provide a high contrast image, data (b) of FIGS. 5 and 6 are written in the first and the second gamma correction LUTs 57, 61, respectively. On the other hand, when making a gradation correction to provide a lower contrast image. data (c) of FIGS. 5 and 6 are used.

Figure 7:
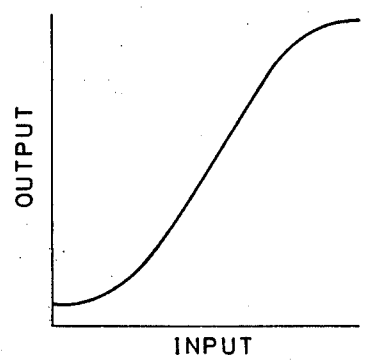
FIG. 7 is a graph showing a characteristic curve of table data for a display LUT.

The video signals sent to the monitor system are input into the display LUT 58 through the first gamma correction LUT 57. In display LUT 58, table data illustrated by the characteristic curve shown in FIG. 7 are written in order to display an image simulating the S-like gradation characteristic of the color photographic paper 2 on the color CRT 43. By processing the video signals in the display LUT 58, a color image which is quite similar to the image ultimately printed on the color photographic paper 2 can be simulated on the color monitor 43. As is apparent from FIGS. 5 and 7, the gradation correction is non-linear in the display LUT 58 but linear in the first gamma correction LUT 57. It is permissible to provide a single LUT representative of the combined characteristics of the LUTs 57 and 58 with which the video signals, after chroma correction. are corrected in gradation non-linearly.

Figure 8:
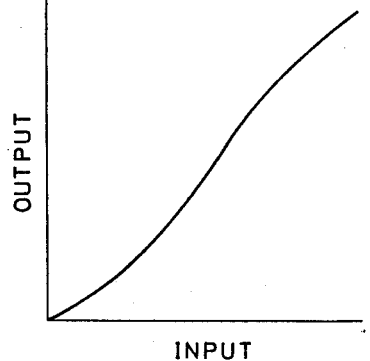
FIG. 8 is a graph showing a characteristic curve of table data for a CRT illumination control LUT.

The video signals sent to the CRT illumination control system are selected by color by means of a switch 64 diagrammatically shown in FIG. 3 and transmitted to the second gamma correction LUT 61. The illumination control LUT 62, wherein table data representative of the characteristic curve shown in FIG. 8 is written, performs a signal conversion for the video signals after chroma and gamma corrections have been performed. It is also permissible to provide a single LUT representative of the combined characteristics of the LUTs 61 and 62.

The switch 66 diagrammatically shown in FIG. 3 is controlled by the CPU 53 to select contact "a" when it is desired to measure the color negative film 11 or contact "b" when it is desired to display a printing pattern on the CRT 1. The measuring illumination pattern memory 63 connected to the contact "a" is addressed by the CRT controller 38 to read out illumination pattern data when measuring the color negative film 11. The illumination data is converted into an analog form by the D/A converter 46 and then sent to the driver 39. The illumination pattern data is used to correct shading occurring due to the CRT 1 and the lens 29. A light measuring pattern or printing pattern is displayed on the CRT 1 through the D/A converter 46 and the driver 39.

The keyboard 56 includes a power key 56c, a print start key 56d, chroma correction keys 56a and gamma correction keys 56b for entering the necessary commands. The CPU 53 executes a programmed sequential control operation for the frame memory 36, chroma correction section 52, first gamma correction LUT 57, second gamma correction LUT 61, CRT controller 38, and switches 37, 64 and 66.

Reference is again had to FIG. 2 for describing the operation of the photographic printer according to this preferred embodiment of the present invention. Upon turning the power switching key 56c on, the negative inspection mode is initiated and the mirror 23 is inserted into the printing path 19 at an angle of 45°. The CPU 53 reads table data suitable for making a normal color correction in the chroma correction section 52 and table data, such as table data (a) shown in FIGS. 5 and 6 suitable for making a normal gradation correction in the first and second gamma correction LUTs 57 and 62, respectively.

Thereafter, the CPU 53 operates the switch 66 to connect the contact "a" so as to read out a pattern signal from the measuring illumination pattern memory 63 and sends it to the CRT 1 through the D/A converter 46 and the driver 39. Consequently, the CRT 1 is excited to emit light in an illumination pattern suitable for the measurement, for a predetermined time period. At this time, the light detecting red filter 25 is placed in the light path 24 and the switch 37 selects contact "a" so as to connect the frame memory 36a to receive the red image. As a result, red video signals for one frame are written in the frame memory 36a. In the same way, video images are written in the frame memories 36b and 36c for green and blue in that order.

The three color video signals written in the frame memory 36 are sent to the logarithmic transformation LUT 51 to provide three color density signals which are then sent to the chroma correction section 52. In the chroma correction section 52, normal chroma correction is made by the matrix operation. After the chroma correction, the video signals are sent to the first gamma correction LUT 57, where the video signals are corrected in gradation using the characteristic line (a) shown in FIG. 5. Then, in the display LUT 58, the video signals are corrected in gradation per the characteristic curve shown in FIG. 7. After these corrections, the video signals are sent to the color monitor 43 through the negative-to-positive reversal circuit 59 and the D/A converter 60 to display the color positive image to be printed.

The color positive image on the color monitor 43 is visually inspected to judge whether chroma and gradation are properly corrected or not. If the color image is improper in chroma, the chroma correction key 56a is operated to select a data channel for reading out desired coefficient data to provide a new set of table data which is written in the LUT of the chroma correction section 52. With the new set of table data, the video image is corrected in chroma and displayed as a color positive image on the color monitor 43.

On the other hand, if the color image displayed on the color monitor 43 is improper in gradation, the gamma correction key 56b is operated. When a high contrast image is desired, table data having the characteristic (b) shown in FIG. 5 is written in the first gamma correction LUT 57 and table data having the characteristic (b) shown in FIG. 6 is written in the second gamma correction LUT 61. In the same way, table data having the characteristics (c) shown in FIGS. 5 and 6 is written in the first and second gamma correction LUTs, respectively, when a lower contrast image is desired. It is to be noted that since gamma correction is effected by color, color balance correction is simultaneously executed. The video signals corrected in gradation with the new table data are sent to the color positive image on the color monitor 43. Such correction procedures are repeated until an ideal color image is displayed on the color monitor 43.

When the color image is judged to be proper for printing the print start key 56d of the keyboard 56 is operated to initiate the printing mode. Consequently, the CPU 53 controls the switch 66 to select the contact "b" so as to connect the CRT 1 to the CRT illumination control LUT 62 and the switch 64 to select at first, for example, the contact "a" so as to select red video signals. The mirror 23 is removed from the printing path 19 and, thereafter, video images in the frame memory 36 are read out and sent to the chroma correction section 52 and the first and second gamma correction LUTs 57 and 61 for chroma and gamma corrections.

The switch 64 receives the video signals for red and sends them to the CRT emission control LUT 62 through the second gamma correction LUT 61. Consequently, the CRT emission control LUT 62 processes the video signals for red according to the table data shown in FIG. 8 and, then, transmits the same to the driver 37 through the D/A converter 46 so as to excite the CRT 1 so as to scan the phosphor screen according to the video signals corrected in chroma and gradation, to thereby form a raster luminance pattern. As described above, because the CRT 1 forms an illumination pattern controlled in luminance by the video signals as filtered and as subjected to chroma and gamma correction after the logarithmic transformation. the CRT 1 emits light with a suitable illumination pattern, resulting in a print with a highly vivid image.

Immediately after the initiation of emission of light from the CRT the red exposure filter 15 is brought into the printing path 19 and the CPU 53 causes the shutter controller 21 to open the shutter 20 for an exposure time suitable for red. so as to form a red latent image on the color photographic paper 2. If the luminance pattern of the CRT 1 includes, for example a part where the luminance is lower than that of the brightness pattern of the light passed through the color negative film 11 when the color negative film 11 was measured, such part of the image will be printed with a red density lower than ordinary.

After the exposure for red. the shutter 20 is closed and the red exposure filter 15 is replaced with the green exposure filter 16. Simultaneously, the switch 64 is controlled to select the contact "b" to retrieve the video signals for green. In the same way as for red, a green latent image is formed over the red latent image on the color photographic paper 2. Thereafter, the blue exposure filter 17 is placed in the printing path 19 and the switch 64 is controlled to select the contact "c" to retrieve the blue video signals. As with red and green, a blue latent image is formed over the red and green latent images on the color photographic paper 2. In this way, an image corrected in chroma and gradation is formed on the color photographic paper 2 by a three color frame sequence exposure. After exposures for the three colors, the printing mode is terminated. It will be noted that the standard data are rewritten in the chroma correction section 42, and in the first and second gamma correction LUTs 46 and 55, respectively at the end of the exposure of each frame.

In the above-described embodiments, the video signals for one frame are filtered by a digital filter 34 to cancel the persistence effect of the CRT and are displayed on a color monitor for visual inspection or used to control the luminance pattern with which the CRT makes an illumination raster. The present invention can be applied to make a single print, such as index prints, including a plurality of invalid images reduced in size. In this case, video images for a plurality of frames are electronically reduced in size and composed and the composite video signals displayed as a composite image on the CRT.

In the photographic printer according to the present invention, an original to be printed is scanned with a flying spot generated by the CRT to provide video signals which are converted into digital form and, then, filtered by a digital filter, making it possible to make use of any type of CRT without considering its persistence characteristic. Therefore, a high luminance CRT can be used, so that the printing exposure time is shortened and the printing cost is lowered.

Furthermore, according to the present invention, since video signals, after being filtered by a digital filter and subjected to various image processing steps, are displayed as a visible image on a monitor, a vivid image can be displayed independently of the persistence of the CRT used.

Still further, since the CRT is controlled in luminance based upon video signals which have been subjected to image processing and are independent of CRT persistence, a high accuracy brightness pattern of the illumination light can be obtained.

Although the present invention has been fully described by way of preferred embodiments thereof with reference to the accompanying drawings, it will be apparent to those skilled in the art that various changes and modifications of these embodiments are possible without departing from the scope of the invention.

What is claimed is:

1. A photographic printer having a CRT for illuminating an original to print an image of said original on a photographic material, said printer comprising,
    a mirror disposed in a printing path between said CRT and said photographic material for reflecting light passed through said original;
    light measuring means for measuring said reflected light to provide a plurality of video signals;
    means for converting said video signals into digital form;
    a digital filter for filtering said digital video signals to cancel a persistency effect of said CRT; and
    a frame memory for memorizing the filtered digital video signals.

2. A printer as defined in claim 1. wherein said mirror is movable into and out of said printing path between said CRT and said photographic material.

3. A printer as defined in claim 1 further comprising three color filters, each being insertable between said mirror and said light measuring means independently of the other two so as to permit separate measurement of said video signals by color.

4. A photographic printer having a CRT for illuminating an original with a flying spot to print an image of said original on a photographic material, said printer comprising:
    a mirror removably disposed in a printing path between said photographic material and said CRT for reflecting said flying spot passed through said original;
    light measuring means for measuring said reflected spot to provide video signals corresponding to said original;
    an A/D converter for converting said video images into digital form;
    a digital filter for filtering said digital video signals to cancel a persistency effect of said CRT;
    logarithmic transformation means for transforming said digital video signals into density signals;
    a frame memory for memorizing said video signals either before or after said logarithmic transformation of said video signals;
    image processing means for processing the video signals read out from said frame memory; and
    monitor means for displaying said video signals as a visible image.

5. A printer as defined in claim 4, wherein said original is a color original and said frame memory memorizes said video signals separately for each of three colors.

6. A printer as defined in claim 5, wherein said image processing means comprises means for effecting chroma correction of said video signals and means for effecting gradation correction of the chroma corrected video signals.

7. A photographic printer having a CRT for illuminating an original with a flying spot to print an image of said original on a photographic material, said printer comprising:
    a mirror removably disposed in a printing path between said CRT and said photographic material for reflecting said flying spot passed through said original;
    light measuring means for measuring said reflected spot to provide video signals corresponding to said original;
    an A/D converter for converting said video signals into digital form;
    a digital filter for filtering said digital video signals to cancel a persistency effect of said CRT;
    logarithmic transformation means for transforming said digital video signals into density signals;
    memory means for memorizing said video signals either before or after said logarithmic transformation;
    image processing means for processing video signals read out from said memory means, to provide image processed video signals; and
    control means for controlling said CRT to provide said flying spot with a luminance determined by said image processed video signals when making a print of said original.

8. A printer as defined in claim 7, wherein said memory means memorizes said video signals separately for each of three colors.

9. A printer as defined in claim 8, wherein said image processing means comprising means for chroma correcting said video signals and means for effecting gradation correction of said chroma corrected video signals.

10. A photographic printer having a CRT for illuminating an original with a flying spot to print a frame of said original on a photographic material, said printer comprising:
    a mirror disposed in a printing path between said CRT and said photographic material for reflecting said flying spot passed through said original;
    light measuring means for measuring said reflected flying spot to provide three color video signals representing said frame;
    an A/D converter for converting said three color video signals into digital form;
    a frame memory for memorizing said three color digital video signals for said frame;
    means for effecting chroma correction of said three color digital video signals read out of said frame memory, using a matrix operation;

means for effecting gradation correction of said chroma corrected digital video signals;

a color monitor for displaying said gradation corrected video signals as a color image thereon; and control means for controlling said CRT to provide said flying spot with luminance controlled according to said digital video signals as corrected in chroma and gradation, when making a print of said frame of said original.

11. A printer as defined in claim 10, further comprising three color filters, each being insertable between said mirror and said light measuring means independently of the other two so that said light measuring means separately provides said video signals for said three colors.

12. A photographic printer comprising:

a CRT for illuminating an original with a flying spot to make a print of said original on a photographic material;

means for controlling an illumination pattern of said CRT;

a mirror disposed in a printing path between said CRT and said photographic material for reflecting said flying spot passed through said original;

light measuring means for measuring said flying spot reflected by said mirror to provide video signals corresponding to said original; and a monitor for displaying said video signals as a visual image thereon before making a print of said original.

13. A printer as defined in claim 12, further comprising red, green and blue filters each insertable between said mirror and said light measuring means independently of the other two so as to separately provide said video signals by color.

14. A printer as defined in claim 12, wherein said mirror is placed in said printing path when monitoring an image and is removed from said printing path when making a print.

15. A printer as defined in claim 12, wherein said control means is a memory in which illumination pattern data is memorized.

* * * * *